Patented Feb. 3, 1948

2,435,545

UNITED STATES PATENT OFFICE 2,435,545

PROCESS FOR THE PRODUCTION OF MERCAPTANS

Joseph P. Lyon, Jr., Phillips, Tex., assignor to Phillips Petroleum Company, a corporation of Delaware No Drawing. Application September 28, 1944, Serial No. 556,283

7 Claims. (Cl. 260—609)

This invention relates to the manufacture of organic sulfur compounds. More specifically this invention relates to a process for maintaining and increasing the selectivity of the catalyst in the production of organic sulfur compounds. In one specific embodiment this invention involves the catalytic reaction of olefins with hydrogen sulfide to selectively produce mercaptans corresponding to the olefin feed charged to the exclusion of lower boiling mercaptans by means of increasing the temperature throughout the reaction period. In a still more specific embodiment it is concerned with the conversion of olefin polymers to mercaptans having the same number of carbon atoms per molecule.

Various organic sulfur compounds have been synthesized by catalytic means. In the case of mercaptans, the reaction of olefins with hydrogen sulfide has been promoted by the use of the appropriate reaction temperatures. Thus using a silica-gel catalyst impregnated with a metal oxide, a temperature of about 225° F. and a pressure of 1,000 pounds per square inch are used to produce mercaptans from an olefin polymer feed.

The conditions of reaction have been modified in several ways to obtain a good yield of the mercaptan product, such as the use of various temperatures, the pre-treatment of the olefin feed by isomerization in order to assure a high yield of the desired product, recirculation or recycle of a portion of the effluent from the reaction of hydrogen sulfide with olefin hydrocarbons, and the use of various diluents.

In those catalytic reactions in which relatively high temperatures are used, there often results substantial amount of undesirable products from side reactions. In the case of the production of $C_{12}$ mercaptans from $C_{12}$ olefins, the undesirable products formed include $C_4$ and $C_8$ mercaptans. The $C_4$ and $C_8$ mercaptans must be separated from the $C_{12}$ mercaptans and their separation constitutes an added expense to the process. The use of high temperatures moreover shortens the life of the catalyst. Therefore, a process which will result in an elimination of side reactions and which will lengthen the life of the catalyst is much to be desired.

The primary object of this invention is to maintain and increase the yield of product in the synthesis of organic sulfur compounds. Another object is to increase the selectivity of the catalyst in the production of mercaptans corresponding to the olefin feed charged. It is also the object of this invention to provide a treatment for catalysts so as to obtain the maximum selectivity of the catalyst toward certain reactions. Still another object of this invention is to decrease the amount of undesirable products as the result of side reactions in the production of mercaptans. Another object is to provide a method for increasing the life of the catalyst in the production of mercaptans. Other objects and advantages of this invention will become apparent, to one skilled in art, from the accompanying disclosure and discussion.

It has now been found that the selectivity of a catalyst in the production of mercaptans can be increased to the substantial exclusion of side reactions by appropriate control of the temperature during the reaction period while maintaining constant other reaction conditions such as pressure, flow rate, and concentration of reactants. In the process of this invention, the temperature of reaction is increased during the reaction period by that certain amount required to increase the selectivity of the catalyst and not simply by an amount required to maintain the rate of reaction or the yield of any particular reaction product. With other conditions constant, the amount of temperature rise required to increase the selectivity of the catalyst toward the primary reactions throughout the process is determined by the increase in temperature necessary to maintain a constant mercaptan-sulfur content of the effluent. Mercaptan-sulfur is defined as that sulfur which is combined with hydrocarbons in the form of mercaptans and does not include sulfur which may be present in other compounds, such as sulfides. Thus, this invention involves an increase in reaction temperature during the course of a continuous process in an amount required to obtain the optimum selectivity of the catalyst and thereby increase the yield of the mercaptan corresponding to the olefin feed.

It has also been found in the catalytic production of mercaptans that the catalyst increases in selectivity with use to the exclusion of side reactions. This increase in selectivity of the catalyst with use may be attributed to a catalytic, or perhaps an anti-catalytic, action of the carbonaceous and/or sulfurous materials deposited on the catalyst itself.

Inasmuch as there is an increase in selectivity of the catalyst with use, another modification of the present invention involves a pretreatment of the catalyst under appropriate conditions to impart thereto the optimum selectivity and subsequently operating the catalyst under conditions favorable to the formation of mercaptans. In the first step of this modification of the present invention, a silica-alumina catalyst is treated for a short time with a mixture of olefins and hydrogen sulfide under conditions of temperature and pressure necessary to give the catalyst its optimum selectivity. The second step comprises passing olefin hydrocarbons and hydrogen sulfide over the resulting pre-treated catalyst under conditions favorable to the formation of mercaptans.

A specific application of this invention is the production of $C_{12}$ mercaptans. The production of such mercaptans is by the reaction of polymers, such as tri-isobutylene or other $C_{12}$ polymeric olefins, with hydrogen sulfide in the presence of a catalyst of silica gel impregnated with an oxide of a metal belonging to one of the groups IIIB and IVA of the periodic system. In such a process it is desired to form as much of the mercaptans corresponding to the olefin feed as possible and as little as possible of lower-boiling mercaptans, such as $C_4$ and $C_8$ mercaptans. These lower-boiling mercaptans apparently are formed by depolymerization of the polymers and the subsequent reaction of the products with hydrogen sulfide. As the reaction proceeds carbonaceous materials are deposited on the catalyst, and one would expect the selectivity of the catalyst to decrease in much the same manner as the decrease in the rate of reaction. This, however, is not the case, for the selectivity of the catalyst toward the production of $C_{12}$ mercaptan increases with the use of the catalyst. If the appropriate temperatures of reaction are used this selectivity of the catalyst may be utilized to the fullest extent. The reaction is ordinarily carried out at a constant pressure of about 1,000 lbs. per square inch gage and at a temperature between about 125° F. and about 275° F. In the application of this invention the temperature is increased continuously or at appropriate intervals during the reaction period a sufficient amount to maintain a constant mercaptan-sulfur content in the effluent. Thus, by maintaining the most optimum conditions of pressure, flow rate, and concentration of reactants, the selectivity of the catalyst toward the production of $C_{12}$ mercaptan can be increased during the reaction period by maintaining a constant mercaptan-sulfur content of the effluent. A portion of the effluent from the reaction may be recycled or recirculated to increase the yield of mercaptans.

The olefin-hydrogen sulfide reaction is smoothly effected in the presence of solid adsorptive catalysts comprising silica and an oxide of metal of group IIIB and IVA of the periodic system. Group IIIB consists of boron, aluminum, gallium, indium, and thallium, and group IVA consists of titanium, zirconium, hafnium and thorium. The catalyst is preferably employed in the form of synthetic precipitated silica gel promoted by relatively minor proportions of the metal oxide.

In general, these catalysts are prepared by first forming a hydrous silica gel or jelly from an alkali silicate and an excess of an acid, washing soluble material from the resulting acidic gel, treating or activating the gel with an aqueous solution of a suitable metal salt and subsequently washing and drying the treated material. In this manner, a part of the metal, presumably in the form of a hydrous oxide or loose hydroxide compound formed by hydrolysis, is selectively adsorbed by the hydrous silica, and is not removed by subsequent washing. It is generally important to insure that the gel is acidic at all times. The most frequently used catalyst of this type, at present, is a silica-alumina catalyst.

In carrying out the olefin-hydrogen sulfide reaction the feed is passed through the catalyst bed, or otherwise reacted in contact with the catalyst, under controlled conditions with respect to the olefin-hydrogen sulfide mol ratio. In order to suppress undesirable side reactions and to favor mercaptan formation, it is desirable to employ a molal excess of hydrogen sulfide. Because of the high degree of specificity toward promotion of the principal mercaptan reaction in this invention, only a moderate excess of hydrogen sulfide is required. Satisfactory reaction mixtures may contain olefin-hydrogen sulfide ratios between about 1:1 and about 1:6 with an intermediate value of 1:1.5 preferred. Ratios lower than 1:1 result in the increased formation of alkyl sulfides and products of low molecular weight.

As previously mentioned, the temperature within the catalyst bed is chosen to maintain a constant mercaptan-sulfur content of the effluent and thereby increase the selectivity of the catalyst toward the formation of the mercaptan corresponding to the olefin feed. Suitable temperatures of preferred operating conditions are usually within the range of about 100° F. to about 400° F.

Since the mercaptan synthesis described hereinbefore is exothermic, means for dissipating any excess heat and preventing excessive temperature increases are ordinarily provided. Such means may include cooling the catalyst bed by internal or external heat exchange apparatus, or more conveniently by reducing the amount of pre-heat supplied to the feed prior to the reaction, or the use of an inert diluent.

Catalyst life in the present process is ordinarily very long since the relatively mild conditions of reaction tend to prevent the formation and accumulation of poisonous materials. Thus, several hundred volumes of mercaptan product may be produced per volume of catalyst before any significant change in activity is evident.

Operating pressures are chosen in accordance with reaction requirements. The desired mercaptan-forming reaction is promoted to some extent by superatmospheric pressures which are effective by virtue of the increased hydrogen sulfide concentration at the active centers of the contact catalysts as well as by suppression of the side reactions which form a greater volume of product per volume of reactant than the principal reaction. The preferred pressures are usually in the range of about 100 to 3,000 pounds per square inch gage; however, the most economical pressures are from 500 to 1,000 pounds per square inch gage.

With the preferred operating conditions of this invention flow rates as high as 10 liquid volumes of feed per hour per volume of catalyst may be employed.

It is desirable to maintain the mercaptan sulfur content in the effluent within the range of about 3 to 11% by weight, and preferably maintained at 6 to 7% for the best operating technique in the present process. The mercaptan sulfur is considered to be that sulfur which is combined with hydrocarbon in the form of mercaptans and is not considered to include sulfur which may be present in other compounds. For example, a material consisting solely of a $C_{12}$ mercaptan, $C_{12}H_{25}SH$, having a molecular weight of 202 will contain 15.85% mercaptan sulfur by weight. A material consisting of equal molal quantities of $C_4$, $C_8$ and $C_{12}$ mercaptans ($C_4H_9SH$, $C_8H_{17}SH$ and $C_{12}H_{25}SH$) having molecular weights of 90, 146, and 202, respectively, will have a mercaptan sulfur content of 21.9% by weight.

The feed stocks for the process of manufacture of the desired mercaptans may be derived from any suitable source, such as catalytic polymerization units. In some cases it is desirable to utilize a feed rich in $C_{11}$ to $C_{14}$ olefins. Commercial triisobutylene or a close cut fraction of heavy polymer produced in the catalytic polymerization of $C_2$ to $C_6$ olefins also may be used as the source of such $C_{11}$ to $C_{14}$ olefins. The latter feed source is especially desirable. Another preferred olefin stock is obtained as a by-product of aviation gasoline codimer production; the source of which affords an economically attractive integration of plant operations. Any heavy polymer within the boiling range of 335° F. to about 400° F. may be satisfactorily utilized in the present process for the synthesis of mercaptans of about 11 to about 14 carbon atoms per molecule.

The hydrogen sulfide may also be derived from any convenient source. Hydrogen sulfide is particularly abundant as a by-product from petroleum refining processes and from natural gasoline treating plants. While often desirable, pure hydrogen sulfide is not essential to the successful operation of this invention. Carbon dioxide, often an impurity with hydrogen sulfide, tends to deactivate the silica-alumina-type catalyst disclosed herein. It, therefore, is preferred to have the concentration of this impurity not greater than about 5% of the hydrogen sulfide.

The process of recovering the mercaptans from the catalyst effluent comprises a stabilization operation for the recovery of unreacted hydrogen sulfide, a stripping operation for the removal of unreacted olefin and/or hydrocarbon impurities and finally a flash distillation of the mercaptan product. The stripping and flash distillation operations may be carried out as diminished pressure operations by using vacuum pumps or steam. Other methods of separating mercaptans from unreacted olefins and other material may be employed if desired.

EXAMPLE I

In this example $C_{12}$ mercaptans were synthesized by reacting hydrogen sulfide with a high-boiling olefin cut containing $C_{12}$ olefins from a heavy polymer at moderately elevated temperature in the presence of a silica-alumina catalyst. This silica-alumina catalyst was prepared by treating a wet, partially dried, hydrous silica-gel with an aluminum salt solution, such as a solution of aluminum chloride or sulfate, and subsequently washing and drying the treated material.

During the run the flow rate, pressure, concentration of reactants and amount of mercaptan sulfur in the effluent was maintained constant. The reaction temperature at the start of the run was 210° F. but was raised at intervals during the run to increase the selectivity of the catalyst toward high boiling mercaptans by increasing it in a manner such that, with other conditions constant, the amount of mercapan-sulfur in the effluent was maintained substantially constant. The following table gives yield figures for four samples taken during the run and for a composite sample of the effluent for the entire run.

TABLE I

Feed—heavy polymer (boiling range 330-390° F.)
Mol ratio of polymers to $H_2S$ 1:1.5
Catalyst chamber—small steel cylinder containing 100 cc. silica-alumina catalyst (10-20 mesh)
360 liquid vol. of feed per vol. of catalyst for entire run

| Sample | 1 | 2 | 3 | 4 | Composite |
|---|---|---|---|---|---|
| Liquid Vol. feed/vol. cat./hr | 2 | 2 | 2 | 2 | 2 |
| Temp., °F | 210-230 | 230-250 | 250-270 | 270-290 | 210-290 |
| Pressure, Pounds/sq. in | 1,000 | 1,000 | 1,000 | 1,000 | 1,000 |
| Yield of high-boiling mercap. based on wt. of polymer converted, per cent | 97.4 | 108.0 | 110.9 | 113.6 | 108.0 |
| Yield of high-boiling mercap. based on wt. of polymer charged, per cent | 28.4 | 3.8 | 21.1 | 14.1 | 23.8 |
| Yield of low-boiling mercap. based on wt. of polymer charged, per cent | 6.2 | 3.9 | 1.4 | 0.8 | 2.0 |
| Yield of inter.-boiling mercap. based on wt. of polymer charged, per cent | 3.6 | 2.2 | 1.2 | 0.5 | 1.3 |
| Yield of high-boiling mercap. based on wt. of mercap. formed, per cent | 77.7 | 87.6 | 90.5 | 93.1 | 87.8 |
| Pounds of high boiling mercap. formed/pound of polymer chgd. (without recycle), lb./lb | 0.34 | 0.31 | 0.25 | 0.1 | 0.24 |
| Mercap. sulfur in effluent, per cent by weight | 4.9 | 4.6 | 4.6 | 4.5 | 4.7 |
| Pounds of heavy mercap. per Pound of low and inter. mercap., lb./lb | 2.86 | 5.05 | 8.12 | 10.8 | 7.20 |

It should be noted that the yield of high boiling mercaptans based on polymer charge increased as the temperature rose for a part of the reaction period and then decreased on further rise in the temperature of reaction. However, there was a continued increase in yield of high boiling mercaptans based on polymer converted. This latter phenomenon demonstrates the increase in selectivity of the catalyst with time and temperature, when the temperature is increased in the manner stated.

EXAMPLE II

In the synthesis of $C_{12}$ mercaptans, a silica-alumina catalyst similar to that used in Example I was pre-treated by passing a mixture of a heavy polymer and hydrogen sulfide over the catalyst at a temperature of 400° F. and a pressure of 1500 pounds per square inch gage for one hour. This pre-treatment of the catalyst increased the selectivity of the catalyst toward the formation of $C_{12}$ mercaptans to the substantial exclusion of lower boiling mercaptans.

After pre-treatment a mixture of heavy polymer and hydrogen sulfide was passed over the pre-treated catalyst under similar conditions used in Example I. However, the temperature was held within the range of 230 to 250° F. Table II is the summation of the data from the run after pre-treatment of the catalyst.

TABLE II

Feed heavy polymer (330-390° F. boiling range)
Mol ratio of polymers to $H_2S$ 1:1.5
Silica-alumina catalyst (10-20 mesh)
300 liquid vol. of feed per vol. of catalyst for entire run

| Sample | Composite |
|---|---|
| Liquid Vol. feed/vol. cat./hr | 2 |
| Temp., °F | 230-250 |
| Pressure, Pounds/sq. in | 1,000 |
| Yield of high-boiling mercap. based on wt. of polymer converted, per cent | 110.0 |
| Yield of heavy mercap. per wt. of polymer charged, per cent | 33.8 |
| Yield of light mercap. per wt. of polymer charged, per cent | 3.75 |
| Pounds of heavy mercap. per pound of low boiling mercap., lb./lb | 9.0 |
| Mercap. sulfur in effluent, per cent by weight | 10 to 5.9 |

Table II shows that the yield of $C_{12}$ mercaptans, as the result of the pre-treatment of the catalyst, is very good and compares favorably to the yield of $C_{12}$ mercaptan in Example I. The sensitivity of the catalyst toward the high boiling mercaptan is greatly increased by the pre-treatment.

Sample 1 of Example I corresponds to the yield of high boiling mercaptan that would be possible without the application of this invention, i. e., increase in temperature in an amount to increase the sensitivity of the catalyst, or a pre-treatment to increase the sensitivity of the catalyst. Both of the above methods of increasing the sensitivity of the catalyst as can be seen produce a better yield of high boiling mercaptan than can be obtained without the application of the present invention.

Although this invention has been described in considerable detail, it will be obvious to those skilled in the art that many variations and modifications may be practiced without departing from the scope of the broad disclosure.

I claim:

1. The process for the production of mercaptans in the presence of a silica gel catalyst which is promoted with minor proportions of at least one oxide of a metal belonging to one of the groups IIIB and IVA of the periodic system operated in such a manner as to increase the selectivity of the catalyst, which comprises passing a mixture of olefin hydrocarbons and hydrogen sulfide over said catalyst under mercaptan-forming reaction conditions, maintaining substantially constant conditions of pressure, flow rate and concentration of reactants, gradually increasing the temperature of reaction throughout the reaction period to maintain a constant mercaptan-sulfur content in the effluent from the reaction thereby obtaining optimum selectivity of said catalyst toward the formation of mercaptans corresponding to the olefins charged and to the substantial exclusion of formation of lower-boiling mercaptans, withdrawing an effluent and separating mercaptans therefrom.

2. The process according to claim 1 in which the temperature of reaction is between about 100° F. and about 400° F.

3. The process according to claim 1 in which a portion of the effluent is recycled through the process and the remaining portion of the effluent is withdrawn for the recovery of mercaptans therefrom.

4. In a continuous process for reacting olefinic polymers and hydrogen sulfide to produce mercaptans in the presence of a silica gel catalyst which is promoted with at least one oxide of a metal belonging to one of the groups IIIB and IVA of the periodic system, the improvement which comprises maintaining relatively constant pressure, rate of flow and concentration of reactants, increasing the reaction temperature during the process to maintain a constant mercaptan-sulfur content of the effluent thereby increasing the selectivity of said catalyst toward formation of mercaptans corresponding to the olefin feed charged and to the substantial exclusion of formation of lower-boiling mercaptans.

5. In a continuous process for reacting olefinic polymers and hydrogen sulfide to produce mercaptans in the presence of a silica gel catalyst which is promoted with an oxide of a metal belonging to one of groups IIIB and IVA of the periodic system and under conditions of a pressure in the range of 500 to 3,000 pounds per square inch, a flow rate not greater than 10 liquid volumes of feed per volume of catalyst, and an olefin-hydrogen sulfide ratio within 1:1 to 1:6, the improvement which comprises increasing the reaction temperature within the range of 100 to about 400° F. while maintaining the other reaction conditions relatively constant during the process to maintain a substantially constant mercaptan sulfur-content of the effluent thereby increasing the selectivity of the catalyst toward formation of mercaptans corresponding to the olefin feed charged and to the substantial exclusion of formation of lower-boiling mercaptans.

6. An improved process for the production of high-boiling mercaptans in the presence of a catalyst, which comprises pre-treating said catalyst at a temperature between 250 and 500° F. and at a superatmospheric pressure in the presence of olefin hydrocarbons and hydrogen sulfide in such a manner as to increase the selectivity thereof, and subsequently passing a mixture of olefins and hydrogen sulfide over said pre-treated catalyst at a temperature between 100 and 400° F. and at a superatmospheric pressure between 500 and 3,000 pounds per square inch in a manner favorable to the formation of mercaptans corresponding to the olefin feed charged, and separating mercaptans from a resulting effluent.

7. In a continuous process for the production of a $C_{12}$ mercaptan by the interaction of a $C_{12}$ olefin with hydrogen sulfide in the presence of an alumina-silica catalyst wherein a mixture of a $C_{12}$ olefin and hydrogen sulfide is passed over said catalyst at a temperature between about 100 and about 400° F. and a pressure between about 100 and about 3000 pounds per square inch gage, and an effluent comprising a $C_{12}$ mercaptan is withdrawn from said reaction, the improvement which comprises maintaining substantially constant conditions of pressure, flow rate and concentration of reactants, and gradually increasing the temperature during the continuous process to maintain a constant mercaptan-sulfur content in said effluent from said reaction between about 3 and about 11 per cent by weight thereby obtaining optimum selectivity of said catalyst toward the formation of a $C_{12}$ mercaptan and to the substantial exclusion of the formation of lower-boiling mercaptans.

JOSEPH P. LYON, JR.

REFERENCES CITED

The following references are of record in the file of this patent:

UNITED STATES PATENTS

| Number | Name | Date |
|---|---|---|
| 2,052,268 | Williams et al. | Aug. 25, 1936 |
| 2,101,096 | Reuter | Dec. 7, 1937 |
| 2,211,990 | Shoemaker | Aug. 20, 1940 |
| 2,257,457 | Fischer et al. | Sept. 30, 1941 |

OTHER REFERENCES

Duffey et al., "Industrial & Eng. Chemistry," vol. 26, pp. 91-93.

Certificate of Correction

Patent No. 2,435,545.  February 3, 1948.

JOSEPH P. LYON, JR.

It is hereby certified that error appears in the printed specification of the above numbered patent requiring correction as follows: Column 6, Table 1, under column 2 thereof, fifth number, for "3.8" read *30.8*; and that the said Letters Patent should be read with this correction therein that the same may conform to the record of the case in the Patent Office.

Signed and sealed this 27th day of April, A. D. 1948.

[SEAL]

THOMAS F. MURPHY,
*Assistant Commissioner of Patents.*